US008738500B1

(12) United States Patent
Finnie (10) Patent No.: US 8,738,500 B1
(45) Date of Patent: May 27, 2014

(54) SYSTEMS AND METHODS FOR REPLACING CRITICAL PAPER COMMUNICATIONS WITH ELECTRONIC MEDIA IN FINANCIAL SERVICE INDUSTRY

(75) Inventor: Jill E. Finnie, San Antonio, TX (US)

(73) Assignee: United Services Automobile Associates (USAA), San Antonio, TX (US)

( * ) Notice: Subject to any disclaimer, the term of this patent is extended or adjusted under 35 U.S.C. 154(b) by 1419 days.

(21) Appl. No.: 11/871,745

(22) Filed: Oct. 12, 2007

(51) Int. Cl.
*G06Q 40/00* (2012.01)

(52) U.S. Cl.
USPC .......................................................... 705/37

(58) Field of Classification Search
None
See application file for complete search history.

(56) References Cited

U.S. PATENT DOCUMENTS

| 4,774,664 | A | | 9/1988 | Campbell et al. | |
|---|---|---|---|---|---|
| 5,134,564 | A | * | 7/1992 | Dunn et al. | 705/33 |
| 6,823,075 | B2 | | 11/2004 | Perry | |
| 7,267,273 | B2 | | 9/2007 | Silverbrook | 235/385 |
| 7,277,870 | B2 | | 10/2007 | Mourad | 705/52 |
| 7,277,880 | B1 | | 10/2007 | Sekine | 707/3 |
| 7,277,919 | B1 | | 10/2007 | Donoho | 705/2 |
| 7,606,733 | B2 | * | 10/2009 | Shmueli et al. | 705/26.35 |
| 2002/0007453 | A1 | * | 1/2002 | Nemovicher | 713/155 |
| 2002/0089534 | A1 | * | 7/2002 | Siekmann | 345/738 |
| 2003/0014371 | A1 | * | 1/2003 | Turgeon | 705/71 |
| 2004/0204996 | A1 | * | 10/2004 | Miralles et al. | 705/14 |
| 2007/0043727 | A1 | * | 2/2007 | Beck et al. | 707/9 |
| 2007/0094080 | A1 | * | 4/2007 | Wiken | 705/14 |

OTHER PUBLICATIONS

"The Authoriative Dictionary of IEEE Standards Terms", Seventh Edition, Copyright @2000, p. 872.*

* cited by examiner

*Primary Examiner* — Robert Niquette
*Assistant Examiner* — Jennifer Liu
(74) *Attorney, Agent, or Firm* — Brooks, Cameron & Huebsch, PLLC (57) ABSTRACT

A method, a system, and a computer-readable medium for soliciting a customer using an interactive computer-readable medium are enclosed. A method, a system, and a computer-readable medium for fostering interactions between a customer and a financial institution are enclosed. A computer-readable medium is enclosed. A method, a system and a computer-readable medium for soliciting a customer using a computer-readable medium.

21 Claims, 6 Drawing Sheets

SYSTEMS AND METHODS FOR REPLACING CRITICAL PAPER COMMUNICATIONS WITH ELECTRONIC MEDIA IN FINANCIAL SERVICE INDUSTRY

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007.

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/871,723, U.S. patent application Ser. No. 11/871,774, U.S. patent application Ser. No. 11/871,795, and U.S. patent application Ser. No. 11/871,816 each filed on Oct. 12, 2007 and each entitled "Systems and Methods for Replacing Critical Paper Communications with Electronic Media in Financial Service Industry."

FIELD

This application deals generally with the method, system and computer-readable instructions for replacing paper communications from a financial institution with electronic media.

BACKGROUND

Traditionally, financial service companies send paper communications, including, but not limited to, bank account statements, credit card statements, insurance policy information, mortgage account statements, and promotional materials to both new and existing customers via the mail. These communications come with such increasing frequency and are often so voluminous that the customer begins to feel overwhelmed with information as the communications continue to pile up. Some of these documents are necessary to send to customers in accord with applicable laws, such as insurance policies and changes in account terms. For the financial institution providing the communications, the costs of providing these communications has increased significantly due to the continually increasing postal rates A more effective way to provide customers with their critical paper communication is to make these communications accessible via an electronic media. However, customers are often reticent to have significant information sent to via email or log on to a website to receive information. This is especially prevalent in older customers or those who shun computer interaction.

SUMMARY

The customer is benefited by this new way to receive these critical communications because he no longer receives paper account statements, policy information and promotional materials. This will eliminate paper clutter typically caused by paper communications. The financial institution is benefited because it may provide customers with the same level of customer service as with the paper communications, but may do so at a lower expense because the cost associated with traditional paper mailings is significantly reduced. Communicating with the customer using the electronic media also allows the financial institution to remain compliant with regulatory requirements for the financial service industry. Further, a financial service institution may provide enhanced marketing materials to the customer to hopefully interest the customer in obtaining expanded services from the institution.

DETAILED DESCRIPTION OF ILLUSTRATIVE EMBODIMENTS

In an effort to reduce costs related to mailing paper communications to customers and to also encourage customers to use the company website, the instant application is related to a financial institution burning critical paper communications to a computer-readable medium, i.e. a compact disc or another media storage device, and mailing this medium to the customer instead of sending these paper communications to the customer through regular mail.

Going paperless will be a significant cost savings measure for financial institutions. Providing electronic media also provides a benefit to the customer because the customer is no longer inundated with mounds of financial institution critical paper, e.g., bank account statements, credit card statements, insurance policy renewals and other insurance policy information, investment account statements, etc. If the financial institution customer is more computer savvy than ever, it should be an easy integration to get customers to use this computer-readable medium to retrieve all of their financial information. For the customer that does not currently bank on-line or conduct other transactions on-line or is otherwise computer-illiterate or resistant, the various embodiments may provide a way for the financial institution to possibly convince these customers that electronic communication is extremely convenient and easier than one might think. Where the current process to access banking documents online may be complicated as the customer has to maneuver several pages of the financial institution's website to access each of his accounts to select whether or not he wants to receive an on-line statement, the various embodiments will walk the customer through the process to get all of these documents on-line thereby simplifying the process. Customer use of the various embodiments will help to drive customers to do business the way that the financial institution wants to do business, in other words, electronically.

Figure 1:
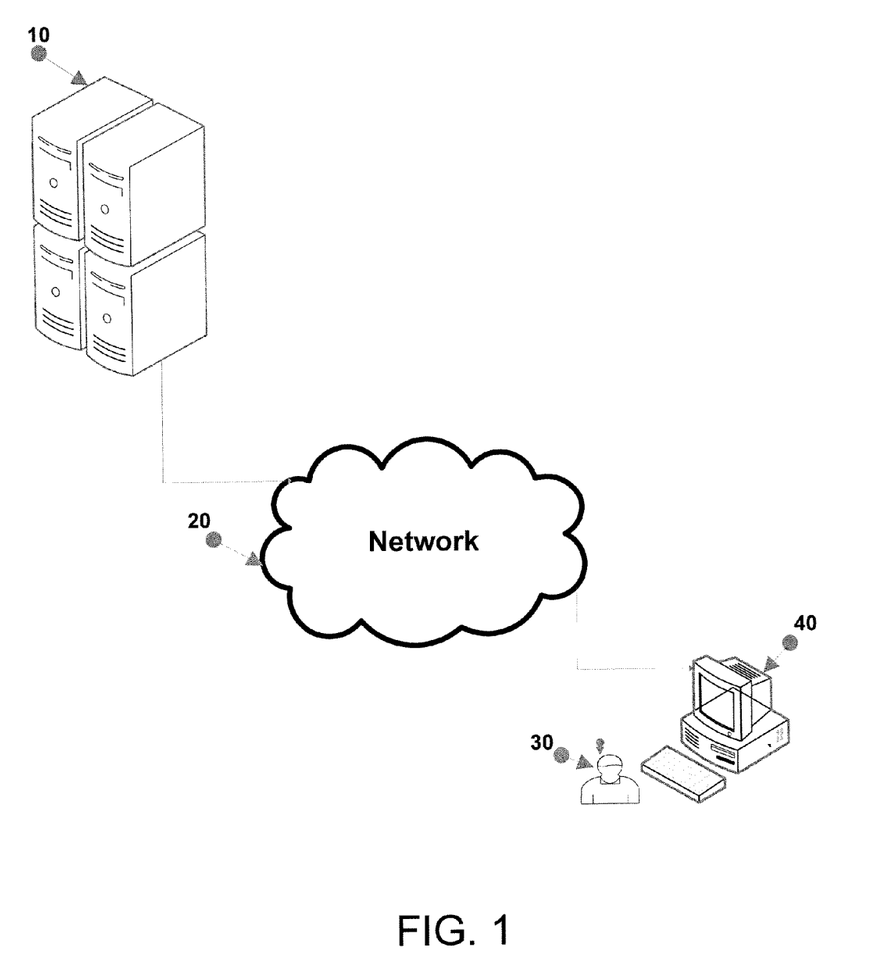
FIG. 1 is a graphical representation of a customer using the computer-readable medium to access the financial institution.

To eliminate all of the information that the customer may require from being on the disc, information may be pulled into the computer-readable medium from the Internet. FIG. 1 shows a customer 30 using his personal computer 40 to access information about the financial institution, including accessing the financial institution's network 10 that contains information that is not stored on the computer-readable storage medium through the use of the disc. The financial institution will provide the customer with a process to access the information on the computer-readable medium. For instance, the computer-readable medium may come with a set of instructions or directions that guide the customer on how to retrieve the information on the disc whether the information on the computer-readable medium is marketing materials, banking documents, insurance policy information, insurance policy price quotes, etc. The customer may tailor the computer readable medium so that downloads of banking documents, such as banking statements may be received more frequently than if mailed, for example, every fifteen (15) days instead of the normal thirty (30) day period.

Figure 2:
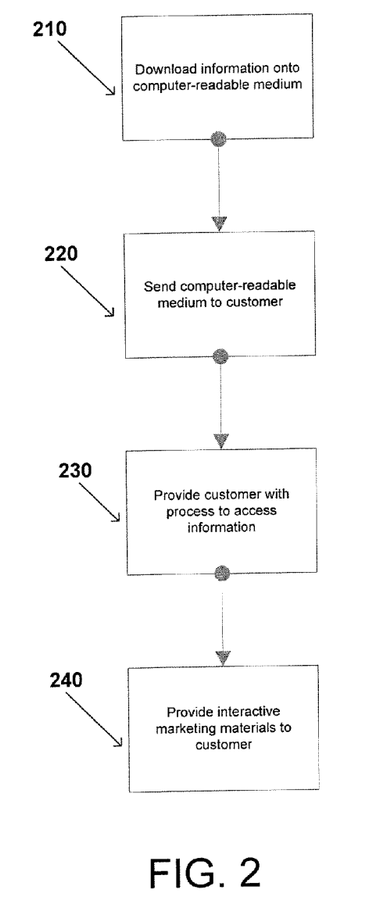
FIG. 2 is a block diagram demonstrating generating a customer using an interactive computer-readable medium.

FIG. 2 shows the process for generating customers using an interactive computer-readable medium, which may be a compact disc, magnetic disc, flash drive or other portable data storage. The financial institution may download its information onto the computer readable medium 210. Once the information is put onto the computer-readable medium, the financial institution sends the computer-readable medium to the customer 220. A customer receiving the computer-readable medium would then insert the computer-readable medium into his computer to view its contents. The computer readable medium will provide the customer with a process or instructions on how to access the information on the computer readable-medium 230 which includes a plethora of marketing materials or information about the financial institution, its products, and services 240.

Figure 3:
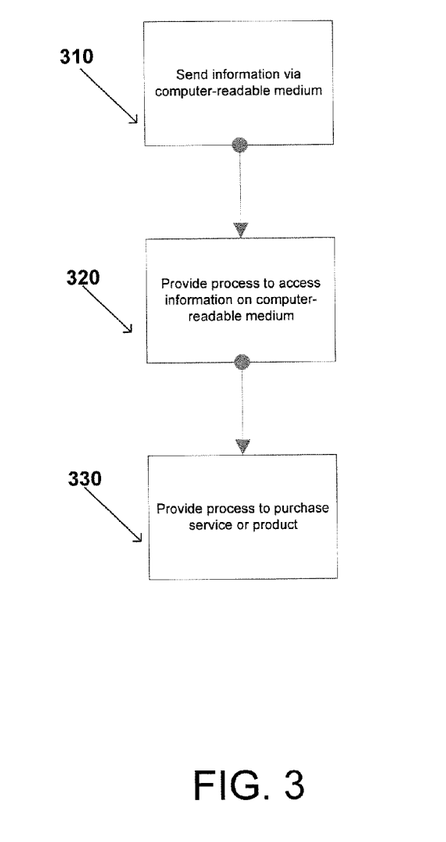
FIG. 3 is a block diagram demonstrating soliciting a customer using an interactive computer-readable medium.

The financial institution is using the interactive computer-readable medium to solicit customers as illustrated in FIG. 3. As many financial institutions exist, it is helpful for each one to have a niche' or multiple niches' to target certain groups of customers. The various embodiments allow the financial institution to market to its target customers using a compact tool. As shown in FIG. 3, the financial institution sends information about its services and products via a computer-readable medium 310. The financial institution provides a process that the customer follows to access the information on the computer-readable medium 320 and provides a process for the customer to follow if he wants to purchase a service or a product discussed on the computer-readable medium 330. For instance, the financial institution may have a package with all the company's services—banking, investments, insurance (e.g., homeowners/renters and automobile) included on the computer-readable medium. The package will show potential customers all the services the financial institution provides. For the existing customer or current member of the financial institution, the package will show new or existing products and services that the customer is not taking advantage of For example, the computer-readable medium may be used to build a retirement plan or to inform and educate the customer about financial planning tools or additional insurance options (i.e. life insurance). It may also be used to provide information to the customer about new promotional offers, i.e. credit cards and credit card rates. Or, the information on the medium may be geared towards life events, i.e. the birth of a child or a child graduating from high school or college. This allows the company to target its marketing to the customer's needs. All this information will be stored in one place—on the computer-readable medium. The package will educate the potential customer on the services and products that the financial institution may provide.

The following shows the process of a customer purchasing a product using the various embodiments. Using the computer-readable medium, the financial institution may provide the customer with policy price quotes. Once the user of the computer-readable medium is satisfied with the quote that is provided, the user may then sign onto the company website to activate the computer-readable medium. Once the customer activates the computer-readable medium, the customer's information and any other necessary information will be filled in or populated into the necessary forms that are part of a product or service fulfillment system so that the customer does not have to complete the policy forms again. The customer agrees to the terms and conditions of the policy agreement and the policy is initiated.

If the customer is not a current member of the financial institution, the customer would then go to the financial institution's website to determine his eligibility as a member. Once accepted as a member, the customer would then upload the information from the computer-readable medium and activate the policy applicable to the quotation and continue to process his transaction on-line. If the user of the computer-readable medium is already an existing member of the financial institution, he would then upload the information from the computer-readable medium and activate the new policy; therefore, skipping the customer eligibility process. Once the computer-readable medium is activated, then it is presumed that all of the customer's policy communications will be accessible via the computer-readable medium; therefore, the mail related to this and other policies will stop. To initiate paper copies of these communications, the customer will have to go on-line and select the option to be put back on the financial institution's customer mailing list.

The instant invention has capabilities in addition to those listed above, such as: (1) it enables the customer to go online and renew a policy providing that an authentication code is entered for security purposes; (2) an insurance building tool that allows the customer to develop an insurance portfolio specific to their needs or the needs of their family; and (3) a mortgage brokerage tool comprising a mortgage payment calculator and mortgage loan product information.

The instant invention allows the customer to obtain up-to-date financial information without having to communicate with a representative and without being confined to the telephone for a long period of time. This tool allows the customer to obtain this information on his own terms. The customer may go through the computer-readable medium during one sitting. Alternatively, he may review a portion of the computer-readable medium at one point in time and review the remainder of the disc at a later date as time permits.

Some of the additional benefits that customers will realize from use of the instant invention follow: (1) the customer may use the computer-readable medium as a storage device for all of his financial documents versus having to keep several multi-page paper documents; (2) the disc allows the customer to retrieve past data from the financial institution, such as the purchase and sales price of a former home, and the address of that home; (3) the instant invention is a way to deliver critical communications from the financial institution to active-duty service members so that their polices do not lapse while away on tours of duty; and (4) once the customer-readable medium is activated, the customer may acknowledge that certain documents were received. The financial institution's system may electronically deliver required regulatory mailings (i.e. forms/policy documents that require acknowledgement of receipt and sometimes a signature), to the customer and have him acknowledge that the documents were received and provide a signature, if necessary, in order to comply with regulatory requirements. The customer may then download and print the documents for his records.

One way to address proving acknowledgement of required regulatory mailings is through knowledge base authentication or KBA. This electronic tool will be used authenticate the customer through the use of personal information that was earlier retrieved by the financial institution. As soon as the computer-readable medium is opened and the customer accesses the required regulatory mailings, the customer would be required to go through the KBA process. If the KBA questions were answered correctly, then it would be documented that the customer received the documents. If the customer experienced difficulties in going through the process of authentication, i.e. the KBA process, then he may select the "click to chat" button that will put the customer in contact with a customer service representative (CSR) who will assist the customer in the authentication process. The "click to chat" option may be a voice recorder that allows the customer to speak to the CSR directly or it may be an instant message service that allows the customer to communicate with the CSR via e-mail in real-time.

To encourage the potential customer to review the computer-readable medium to learn about the financial institution's services or to encourage the existing customer to use the computer-readable medium, enroll in a product(s), and begin to receive communications via electronic media; the financial institution may provide the customer with incentives. To explain, the financial institution may provide the customer with a small discount on policy rates, free interest on a credit card or on an auto loan for a short predetermined amount of time, or reward points towards airline tickets to encourage continued long-term use of communications with electronic media.

Figure 6:
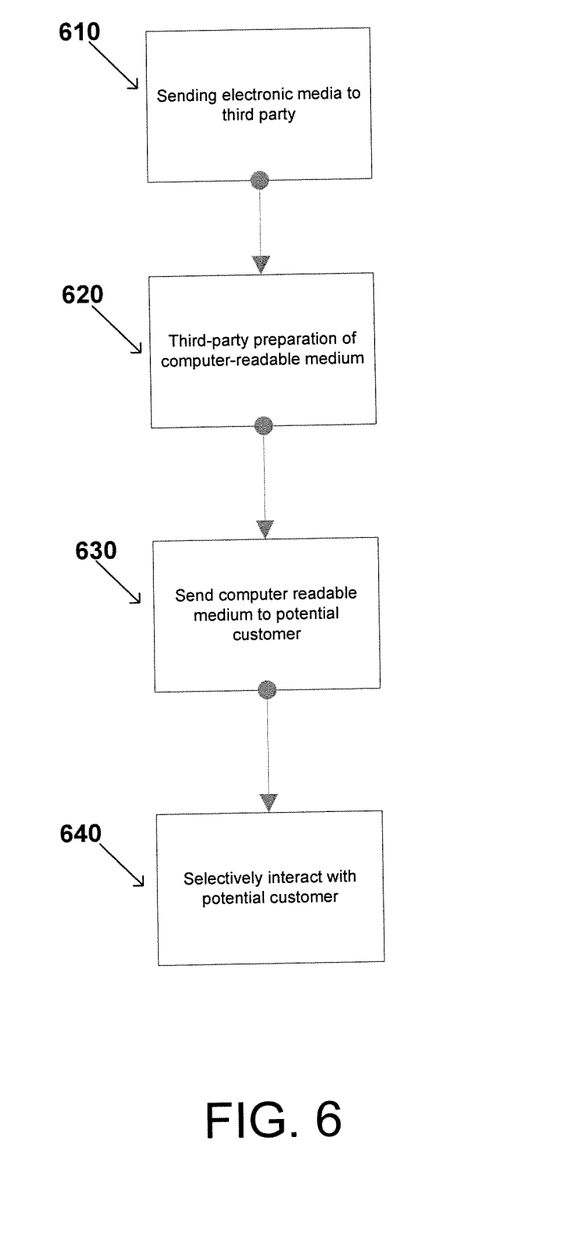
FIG. 6 is a block diagram representing a third party soliciting customers on behalf of a financial institution.

The method for soliciting customers using a computer-readable medium is not only possible through financial institution, but is also capable of being achieved through the help of a third party. FIG. 6 shows the steps for such process. The financial institution sends electronic media to a third party 610 who then prepares a computer-readable medium that contains the electronic media 620. The third party then sends the computer-readable medium to a potential customer 630 and selectively interacts with the potential customer as he accesses the information on the computer-readable medium 640.

Figure 4:
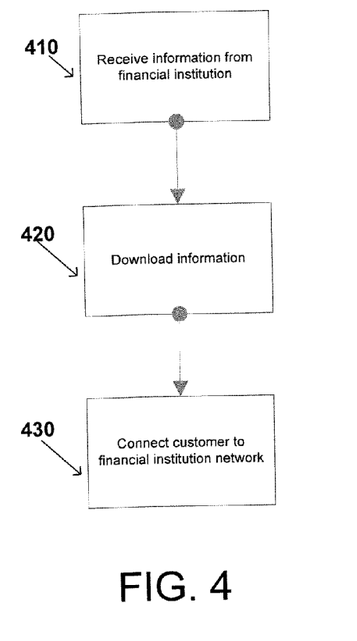
FIG. 4 is an exemplary and non-limiting example of a system that receives information from a financial institution and uses it to foster interactions between a customer and a financial institution.
Figure 5:
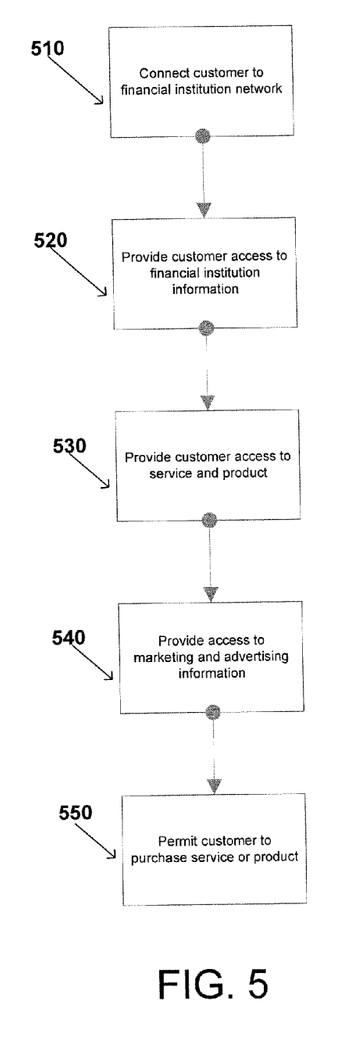
FIG. 5 is an exemplary and non-limiting example of a system that takes information received from a financial institution and provides it to a customer using it to foster interactions between a customer and a financial institution.

FIGS. 4 and 5 illustrate how interactions between the customer and the financial institution occur with respect to the instant invention. FIG. 4 is drawn from the viewpoint of the financial institution. For example, the system receives information from the financial institution to be forwarded to the customer 410. The information is downloaded to a computer-readable medium 420 and the customer is connected to the financial institution's network 430 through the use of the computer-readable medium. FIG. 5 shows this interaction from the perspective of the customer. The customer through the use of the computer-readable medium is connected to the financial institution's network 510. Through the use of the computer-readable medium, the customer is provided with access to his own financial information 520, to information about products and services offered by the financial institution 530, and to general marketing and advertising material about the financial institution 540. Of particular importance is the fact that the customer is allowed to purchase products and services from the financial institution through the use of the computer-readable medium 550.

Description of Exemplary Computing and Network Environments

Figure 7:
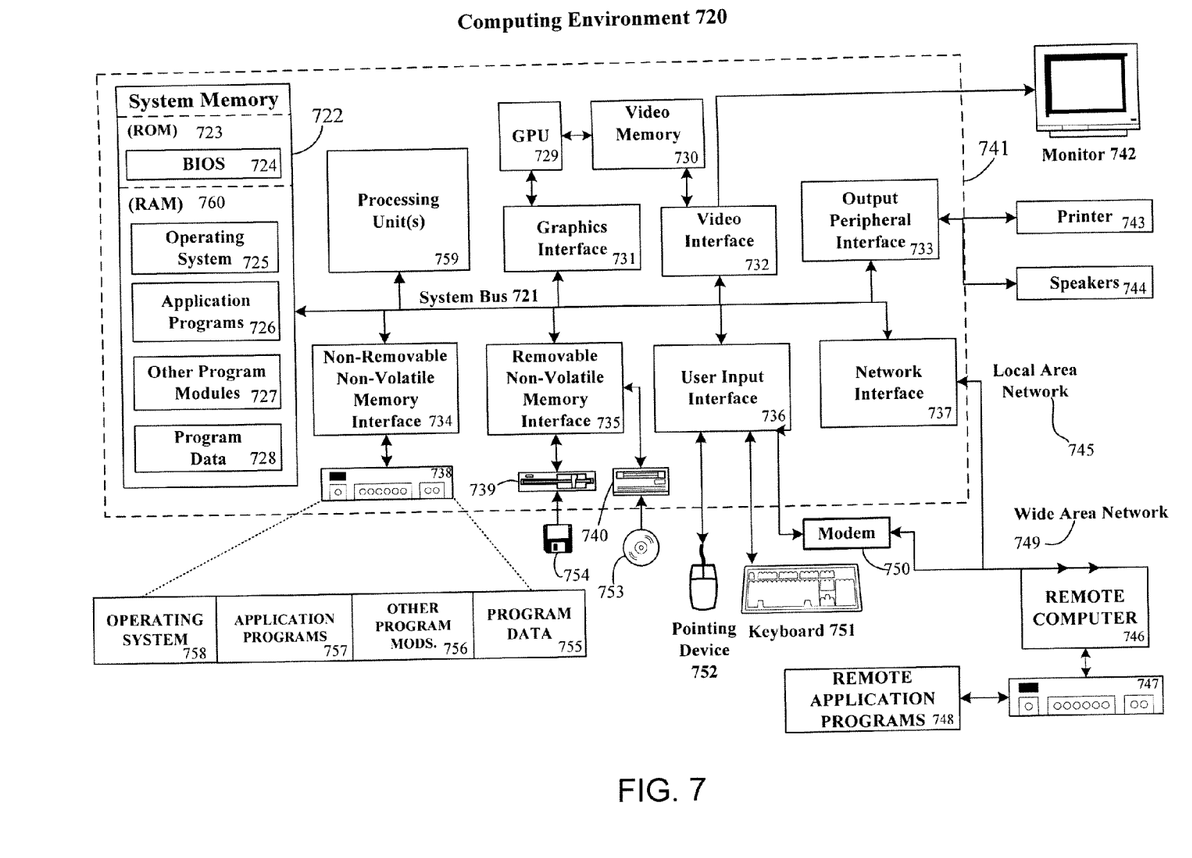
FIG. 7 is a block diagram representing an exemplary computing device environment in which the illustrative embodiments may be employed.

Referring to FIG. 7, shown is a block diagram representing an exemplary computing device suitable for use in conjunction with implementing the systems and methods described above. For example, the computer executable instructions that carry out the processes and methods described herein may reside and/or be executed in such a computing environment as shown in FIG. 6. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the exemplary operating environment 720.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable customer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that performs particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 741. Components of computer 741 may include, but are not limited to, a processing unit 759, a system memory 722, and a system bus 721 that couples various system components including the system memory to the processing unit 759. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 741 typically includes a variety of computer readable media. Computer readable media may be any available media that may be accessed by computer 741 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may accessed by computer 741. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 722 includes computer storage media in the form of volatile and/or nonvolatile memory such as read only memory (ROM) 723 and random access memory (RAM) 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 6 illustrates operating system 725, application programs 726, other program modules 727, and program data 728.

The computer 741 may also include other removable/non-removable, volatile/nonvolatile computer storage media. By way of example only, FIG. 6 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through an non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 7, provide storage of computer readable instructions, data structures, program modules and other data for the computer 741. In FIG. 5, for example, hard disk drive 738 is illustrated as storing operating system 758, application programs 757, other program modules 756, and program data 755. Note that these components may either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A monitor 742 or other type of display device is also connected to the system bus 721 via an interface, such as a video interface 732. In addition to the monitor, computers may also include other peripheral output devices such as speakers 744 and printer 743, which may be connected through a output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 747 has been illustrated in FIG. 7. The logical connections depicted in FIG. 7 include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 7 illustrates remote application programs 748 as residing on memory device 747. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) may be implemented in assembly or machine language, if desired. In any case, the language may be a compiled or interpreted language, and combined with hardware implementations.

Although exemplary embodiments may refer to using aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, handheld devices, supercomputers, or computers integrated into other systems.

In light of the diverse computing environments that may be built according to the general framework provided in FIG. 6, the systems and methods provided herein may not be construed as limited in any way to a particular computing architecture. Instead, the presently disclosed subject matter should not be limited to any single embodiment, but rather should be construed in breadth and scope in accordance with the appended claims.

Figure 8:
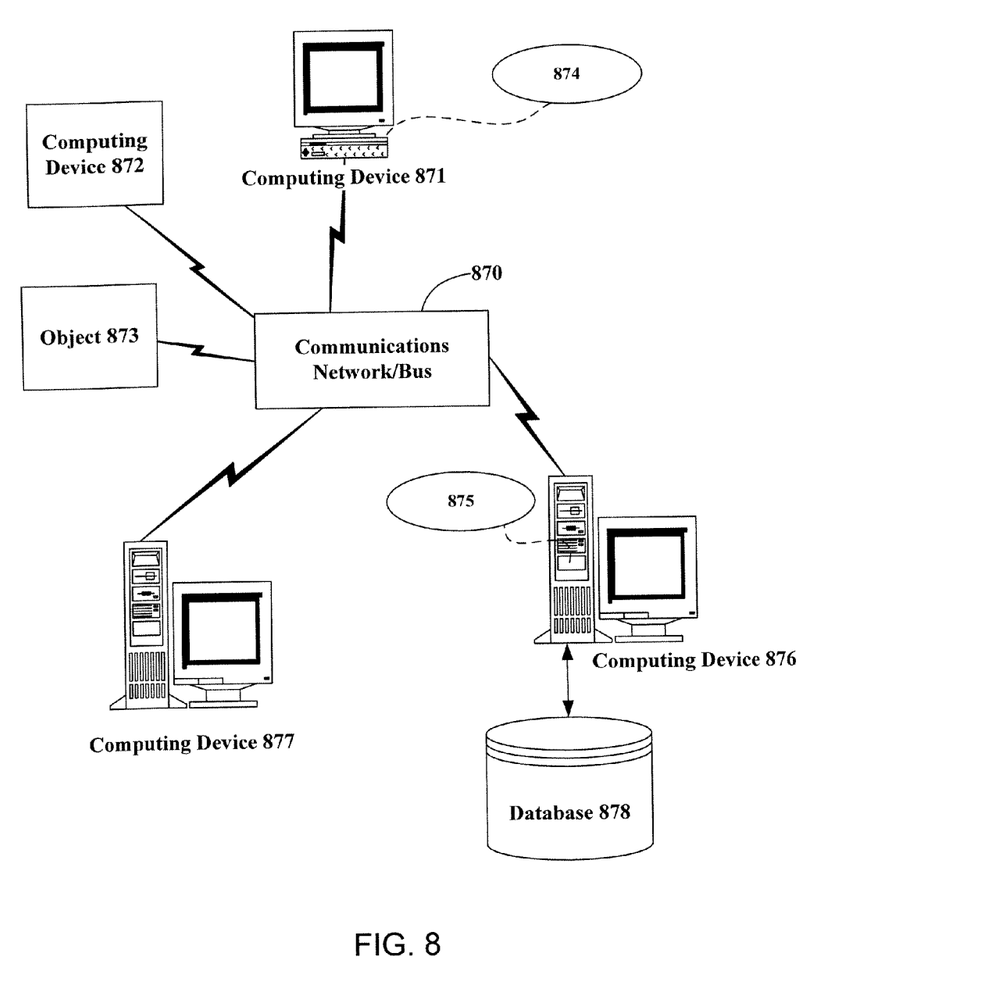
FIG. 8 is a block diagram representing an exemplary networked computing environment in which the illustrative embodiments may be employed.

Referring next to FIG. 8, shown is an exemplary networked computing environment in which many computerized processes may be implemented to perform the processes described above. One of ordinary skill in the art may appreciate that networks may connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 8 provides a schematic diagram of an exemplary networked or distributed computing environment. The environment comprises computing devices 871, 872, 876, and 877 as well as objects 873, 874, and 875, and database 878. Each of these entities 871, 872, 873, 874, 875, 876, 877, and 878 may comprise or make use of programs, methods, data stores, programmable logic, etc. The entities 871, 872, 873, 874, 875, 876, 877, and 878 may span portions of the same or different devices such as PDAs, audio/video devices, MP3 players, personal computers, etc. Each entity 871, 872, 873, 874, 875, 876, 877, and 878 may communicate with another entity 871, 872, 873, 874, 875, 876, 877, and 878 by way of the communications network 870. In this regard, any entity may be responsible for the maintenance and updating of a database 878 or other storage element.

This network 870 may itself comprise other computing entities that provide services to the system of FIG. 8, and may itself represent multiple interconnected networks. In accordance with an aspect of the presently disclosed subject matter, each entity 871, 872, 873, 874, 875, 876, 877, and 878 may contain discrete functional program modules that might make use of an API, or other object, software, firmware and/or hardware, to request services of one or more of the other entities 871, 872, 873, 874, 875, 876, 877, and 878.

It may also be appreciated that an object, such as 875, may be hosted on another computing device 876. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 8, any entity 871, 872, 873, 874, 875, 876, 877, and 878 may be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another using the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) may be used to identify the server or client computers to each other. The network address may be referred to as a URL address. Communication may be provided over a communications medium, e.g., client(s) and server(s) may be coupled to one another via TCP/IP connection(s) for high-capacity communication.

In light of the diverse computing environments that may be built according to the general framework provided in FIG. 8 and the further diversification that may occur in computing in a network environment such as that of FIG. 8, the systems and methods provided herein may not be construed as limited in any way to a particular computing architecture or operating system. Instead, the presently disclosed subject matter should not be limited to any single embodiment, but rather should be construed in breadth and scope in accordance with the appended claims.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method for soliciting a customer using an interactive computer-readable medium, the method comprising:
    sending a computer-readable medium to the customer, the computer-readable medium including information about a financial institution;
    activating the computer-readable medium by accessing the information on the computer-readable medium, wherein activating the computer-readable medium includes stopping paper mailing to the customer;
    offering a financial incentive to encourage the customer to:
        purchase a service or a product from the financial institution provided in the information on the computer-readable medium; or
        receive communications via electronic media about the service or the product;
    receiving a notification that the customer is purchasing the service or the product offered by the financial institution using the computer-readable medium;
    delivering a number of electronic regulatory mailings to the customer, wherein regulatory mailings are mailings required by a financial institution regulator; and
    knowledge base authenticating the customer to validate the customer identity and that the customer has received the number of electronic regulatory mailings.

2. The method of claim 1, wherein sending the computer-readable medium to the customer comprises providing interactive marketing materials to the customer using the computer-readable medium to educate the customer on a service or a product.

3. The method of claim 1, wherein sending the computer-readable medium to the customer comprises including a tool that provides price quotes on the services of the financial institution.

4. The method of claim 1, further comprising sending information comprising at least one of a banking statement, insurance policy information, a mortgage brokerage tool and an insurance building tool.

5. The method of claim 1, further comprising:
    uploading information collected on the computer readable medium onto a financial institution website;
    pre-filling the information collected on the computer-readable medium into a service fulfillment system or a product fulfillment system; and
    completing a purchase of the service or the product.

6. The method of claim 5, further comprising allowing a nonmember to enroll with the financial institution, thereby becoming the customer.

7. The method of claim 1, wherein the computer-readable medium is a compact disc.

8. A system for soliciting a customer using a non-transitory interactive computer-readable medium having computer-readable instructions stored thereon for execution by a number of processor devices, the system comprising:
    a processor device;
    a memory coupled to the processor device;
    at least one subsystem deployed in the memory and executed by the processor device to cause a computer-readable medium to be sent to the customer, the computer-readable medium including information about a financial institution;
    at least one subsystem deployed in the memory and executed by the processor device to activate the computer-readable medium by accessing the information on the computer-readable medium, wherein activate the computer-readable medium includes stopping paper mailing to the customer;
    at least one subsystem deployed in the memory and executed by the processor device to offer by a computing device a financial incentive to encourage the customer to:
        purchase a service or a product from the financial institution provided in the information on the computer-readable medium; or
        receive communications via electronic media about the service or the product;
    at least one subsystem deployed in the memory and executed by the processor device to facilitate purchasing the service or the product offered by the financial institution using the computer-readable medium;
    at least one subsystem deployed in the memory and executed by the processor device to deliver a number of regulatory mailings to the customer, wherein regulatory mailings are mailings required by a financial institution regulator; and
    at least one subsystem deployed in the memory and executed by the processor device to knowledge base authenticate the customer to validate the customer identity and that the customer has received the number of regulatory mailings.

9. The system of claim 8, wherein the at least one subsystem deployed in the memory and executed by the processor device to cause a computer-readable medium to be sent to the customer comprises a subsystem to provide interactive marketing materials to the customer using the computer-readable medium to educate the customer on a service or a product.

10. The system of claim 8, wherein the at least one subsystem deployed in the memory and executed by the processor device to cause a computer-readable medium to be sent to the customer comprises a subsystem including a tool that provides price quotes on the services of the financial institution.

11. The system of claim 8, further comprising at least one subsystem deployed in the memory and executed by the processor device to cause a computer-readable medium to be sent to the customer that includes information comprising at least one of a banking statement, insurance policy information, a mortgage brokerage tool, and an insurance building tool.

12. The system of claim 8, wherein the at least one subsystem deployed in the memory and executed by the processor device to facilitate purchasing a service or a product comprises:
   uploading information collected on the computer readable medium onto a financial institution website;
   pre-filling the information collected on the computer-readable medium into a service fulfillment system or a product fulfillment system; and
   completing a purchase of the service or the product.

13. The system of claim 12, further comprising at least one subsystem deployed in the memory and executed by the processor device to allow a nonmember to enroll with the financial institution, thereby becoming the customer.

14. The system of claim 8, wherein the computer-readable medium is a compact disc.

15. A non-transitory computer-readable medium comprising computer readable instructions for soliciting a customer using an interactive computer-readable medium, the computer-readable instructions comprising instructions to:
   send a computer-readable medium to the customer, the computer-readable medium including information about a financial;
   activate the computer-readable medium by accessing the information on the computer-readable medium, wherein activate the computer-readable medium includes stopping paper mailings to the customer;
   offer a financial incentive to encourage the customer to:
      receive a notification that the customer has purchased a service or a product from the financial institution provided in the information on the computer-readable medium; or
      receive communications via electronic media about the service or the product;
   purchase the service or the product offered by the financial institution using the computer-readable medium;
   deliver a number of regulatory mailings to the customer, wherein regulatory mailings are mailings required by a financial institution regulator; and
   knowledge base authenticate the customer to validate the customer identity and that the customer has received the number of regulatory mailings.

16. The computer-readable medium of claim 15, wherein instructions to send a computer-readable medium to the customer comprises providing on the computer-readable medium interactive marketing materials to the customer using the computer-readable medium to educate the customer on a service or a product.

17. The computer-readable medium of claim 15, wherein instructions to send a computer-readable medium to the customer comprises including a tool that provides price quotes on the services of the financial institution.

18. The computer-readable medium of claim 15, further comprising instructions to send information comprising at least one of a banking statement, insurance policy information, a mortgage brokerage tool and an insurance building tool.

19. The computer-readable medium of claim 15, wherein instructions to purchase a service or a product further comprise:
   uploading information collected on the computer readable medium onto a financial institution website;
   pre-filling the information collected on the computer-readable medium into a service fulfillment system or a product fulfillment system; and
   completing a purchase of the service or the product.

20. The computer-readable medium of claim 19, further comprising instructions to allow a nonmember to enroll with the financial institution, thereby becoming the customer.

21. The computer-readable medium of claim 15, wherein the computer-readable medium is a compact disc.

* * * * *